(12) United States Patent
Sella et al.

(10) Patent No.: US 9,735,956 B2
(45) Date of Patent: Aug. 15, 2017

(54) KEY LADDER APPARATUS AND METHOD

(71) Applicant: Cisco Technology, Inc., San Jose, CA (US)

(72) Inventors: Yaron Sella, Beit Nekofa (IL); Michal Devir, Haifa (IL); Harel Cain, Jerusalem (IL); Perry Smith, Maale Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 14/809,300

(22) Filed: Jul. 27, 2015

(65) Prior Publication Data

US 2017/0063538 A1 Mar. 2, 2017

(30) Foreign Application Priority Data

Dec. 24, 2014 (IL) .......................................... 236439

(51) Int. Cl.
*H04L 9/00* (2006.01)
*H04L 9/08* (2006.01)
*G09C 1/00* (2006.01)
*G06F 21/72* (2013.01)

(52) U.S. Cl.
CPC ............ *H04L 9/0816* (2013.01); *G06F 21/72* (2013.01); *G09C 1/00* (2013.01); *H04L 9/002* (2013.01); *H04L 2209/12* (2013.01); *H04L 2209/38* (2013.01)

(58) Field of Classification Search
USPC ....................................................... 380/277
See application file for complete search history.

(56) References Cited

U.S. PATENT DOCUMENTS

| 5,724,428 | A | 3/1998 | Rivest |
| 7,711,115 | B2 * | 5/2010 | Candelore ............ H04N 7/1675 380/227 |
| 7,797,552 | B2 | 9/2010 | Kahn et al. |

(Continued)

OTHER PUBLICATIONS

Menezes, A.; Handbook of Applied Cryptography, Chapter 13, pp. 551-553 (1996).

(Continued)

*Primary Examiner* — Amare F Tabor
(74) *Attorney, Agent, or Firm* — Samuel M. Katz

(57) ABSTRACT

In one embodiment a method, apparatus and system for is described for receiving a first input including a first decryption key and a second input including an encrypted second decryption key at a cryptographic decryption apparatus, the encrypted second decryption key to be decrypted by the cryptographic apparatus according to the first decryption key, storing a value of a key ladder length in a first register by a cryptographic processor, and using the stored value as a loop index by the cryptographic processor for a number of iterations of the cryptographic decryption apparatus executed as a loop, wherein at one stage in the loop execution of the cryptographic decryption apparatus, the second input includes the key ladder length, wherein the loop operation of the cryptographic decryption apparatus operates for a number of iterations equal to an initial value of the loop index. Related methods, apparatuses and systems are also described.

17 Claims, 4 Drawing Sheets

(56) References Cited

U.S. PATENT DOCUMENTS

| | | | | |
|---|---|---|---|---|
| 7,933,410 | B2* | 4/2011 | Fahrny | H04N 21/4623 |
| | | | | 380/201 |
| 8,374,338 | B2* | 2/2013 | Chan | H04L 9/088 |
| | | | | 380/2 |
| 8,572,408 | B2* | 10/2013 | Candelore | H04N 7/165 |
| | | | | 713/193 |
| 9,008,304 | B2* | 4/2015 | Epp | G06F 21/10 |
| | | | | 380/44 |
| 9,392,318 | B2* | 7/2016 | Candelore | H04N 21/42623 |
| 9,608,804 | B2* | 3/2017 | Chen | H04L 9/0816 |
| 2005/0172132 | A1* | 8/2005 | Chen | H04L 9/0822 |
| | | | | 713/180 |
| 2006/0184796 | A1 | 8/2006 | Fahrny | |
| 2007/0239605 | A1* | 10/2007 | Munguia | G06F 21/602 |
| | | | | 705/50 |
| 2009/0190762 | A1* | 7/2009 | Dellow | H04L 9/0891 |
| | | | | 380/277 |
| 2012/0321080 | A1* | 12/2012 | Candelore | H04N 21/42623 |
| | | | | 380/201 |
| 2013/0279691 | A1* | 10/2013 | Chen | H04L 9/0822 |
| | | | | 380/44 |

OTHER PUBLICATIONS

ETSI TS 103 162 V1.1.1 (Oct. 2010); Access, Terminals, and Multiplexing (ATTM); Integrated Broadband Cable and Television Networks; K-LAD Functional Specification.

* cited by examiner

US 9,735,956 B2

KEY LADDER APPARATUS AND METHOD

TECHNICAL FIELD

The present disclosure generally relates to key ladders for use in cryptographic applications.

BACKGROUND

A Key-Ladder is a generic cryptographic construction used mostly in the content distribution domain. Typically, it comprises chaining of keyed cryptographic operations, such that each one of those operations gets its key from the output of the previous operation. The input for all operations in a key ladder is typically provided from outside of the key ladder. The highest (i.e., the first) level of the key ladder typically gets its key from the hardware itself (for example and without limiting the generality of the foregoing, from One-Time-Programmable [OTP] memory). The lowest (i.e. the final) level of the key ladder typically outputs its result out of the key-ladder for general use—for example, for decrypting encrypted content or other appropriate ciphertexts. Key-ladder intermediate levels generate varying levels of intermediate service-keys, which are typically refreshed in decreasing frequency: i.e., never, yearly, monthly, weekly, daily, etc. Alternatively, each of these intermediate keys may be provided by different entities.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method, apparatus and system for a cryptographic key ladder is described, the method, apparatus and system including receiving a first input including a first decryption key and a second input including an encrypted second decryption key at a cryptographic decryption apparatus, the encrypted second decryption key to be decrypted by the cryptographic apparatus according to the first decryption key, storing a value of a key ladder length in a first register by a cryptographic processor, and using the stored value as a loop index by the cryptographic processor for a number of iterations of the cryptographic decryption apparatus executed as a loop, wherein at one stage in the loop execution of the cryptographic decryption apparatus, the second input includes the key ladder length, wherein the loop operation of the cryptographic decryption apparatus operates for a number of iterations equal to an initial value of the loop index.

Exemplary Embodiments

In the present specification and claims the term "plaintext", in all of its grammatical forms is understood as referring to information which a sender is transmitting to a receiver. Likewise, the term "ciphertext" refers to the result of an encryption operation which has been performed on the plaintext. The text of the "plaintext" is the binary form of the information to be transmitted. Similarly, the encrypted "ciphertext" is the result of performing an encryption operation on a plaintext. Less formally, the information in non-binary form may also be referred to as plaintext and ciphertext. Thus a video clip (as opposed to a binary video file), for example, may be referred to as a "plaintext" which, when encrypted produces a "ciphertext", i.e. an encrypted video file. It is understood that the encrypted video file is actually the output of an encryption operation executed on the binary form of the plaintext video.

Figure 1:
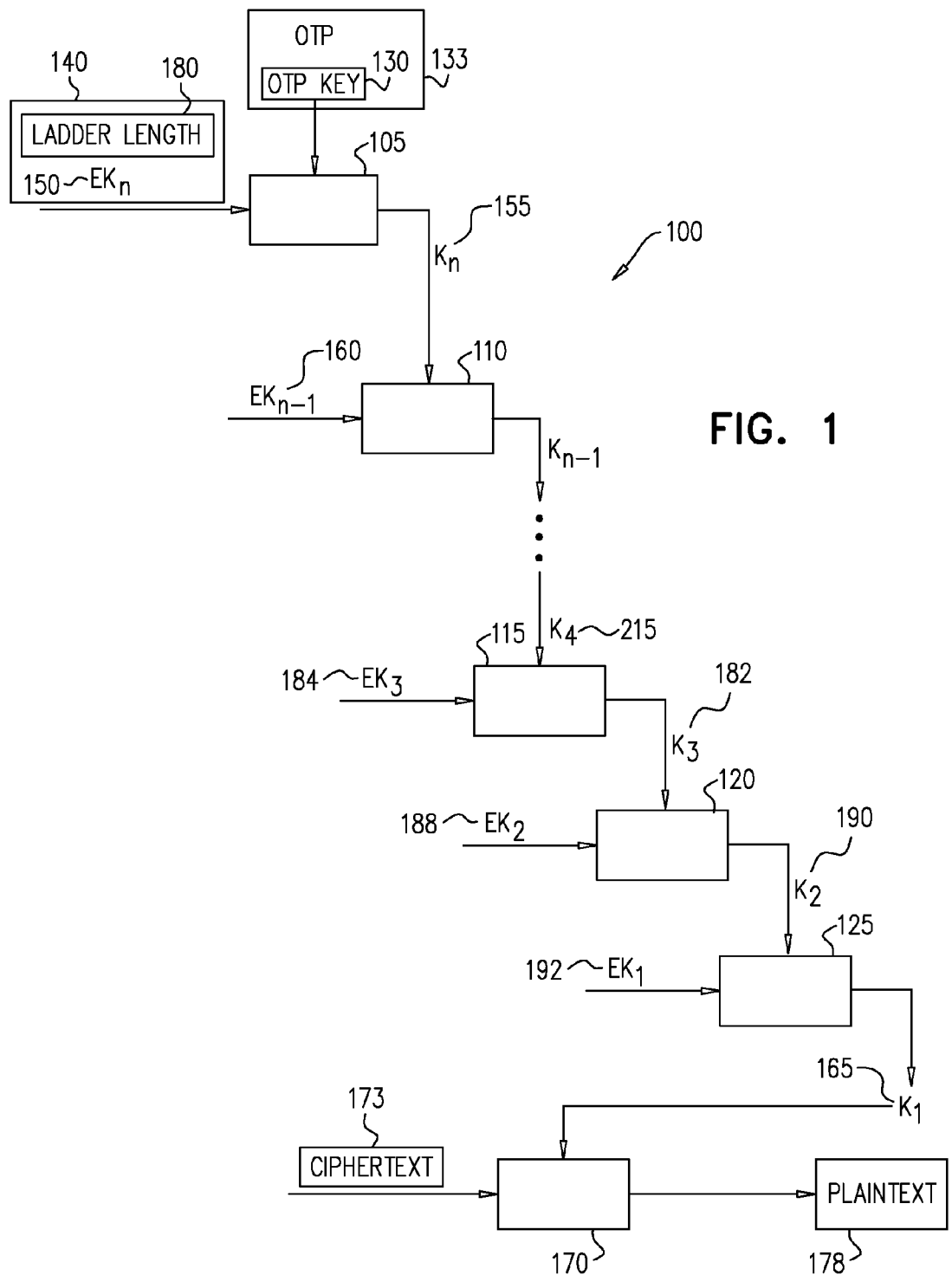
FIG. 1 is a simplified illustration of an extendable key ladder constructed and operative in accordance with a first embodiment.

Reference is now made to FIG. 1 which is a simplified illustration of an extendable key ladder 100 constructed and operative in accordance with a first embodiment. FIG. 1 depicts an extendable key ladder 100 which encodes a number of levels to be executed in the key ladder embedded inside a top level input (or output) of the key-ladder. The key ladder 100 depicted in FIG. 1 comprises a plurality of decryptors 105, 110, 115, 120, 125.

For efficient processing, a decryptor (i.e. a cryptographic decryption apparatus, such as any one of the plurality of decryptors 105, 110, 115, 120, 125) typically comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the decryptor may be carried out by a programmable processor, such as a microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media.

The plurality of decryptors 105, 110, 115, 120, 125 may comprise a single cryptographic decryption apparatus—i.e. the same dedicated hardware (or, if appropriate, software) may be used repeatedly, albeit with different keys and ciphertexts in each decryption step, with a counter used to keep track of the number of rounds which either have already been executed or remain to be executed. Alternatively, the plurality of decryptors 105, 110, 115, 120, 125 may comprise a plurality of cryptographic decryption apparatuses. That is to say, a plurality of different hardware implementations of decryptors may be used in performing the decryption steps in FIG. 1. Persons of skill in the art will appreciate that the option of using a single decryption apparatus is a more cost-effective design. By way of example, if the key ladder 100 of FIG. 1 has three decryption steps, then one hardware decryptor may perform all of the decryption steps; alternatively, two of the decryption steps may be performed by a single hardware decryptor and the third decryption step may be performed by a second hardware decryptor; or still further alternatively, each one of the decryption steps may be performed by a different hardware decryptor.

The service-keys generated by the key ladder 100 in its intermediate levels (e.g. decryptors 110, 115, 120, etc.) are lucrative targets for attackers to discover, expose and distribute. Thus, one of the main goals of the key ladder 100 designer is to design the key ladder 100 such that the intermediate keys (e.g. $K_{n-1}$, $K_4$ 215, $K_3$ 182, etc.) do not leak out to such attackers. This is typically achieved by storing the intermediate keys in volatile memory (e.g., Flip Flops) that is dedicated to the key ladder 100 apparatus, and is inaccessible to other components (e.g., CPUs) operating in the same system. Typically keys at higher levels of the key ladder 100 are more valuable, because lower level keys can be derived from them (i.e. key $K_4$ 215 is more valuable than key $K_2$ 190).

The designer of a key ladder 100 often faces conflicting requirements. On the one hand, it is desirable to include multiple levels in the key ladder 100, such that the key ladder 100 is flexible and can support all current and future use cases, which may require different numbers of levels. On the other hand, if a certain use case requires only three levels, it is wasteful to have the key ladder 100 execute, for example, 50 levels, just because in some future scenario, 50 levels may be necessary. And as was noted above, in addition to these two conflicting requirements, the key ladder 100 must also be secure against key leakage, as explained above.

Intermediate keys are not output where an attacker can easily access them, but rather, are maintained in secure hardware. Therefore, an attacker trying to obtain such an intermediate key, such as, for example $K_3$ 182 (which might be a key which is changed monthly), might attempt to reduce the number of rounds in the extendable length key ladder 100 with the hope of being able to extract it from the key ladder. However, in order to successfully extract the intermediate key, the attacker will also have to change the key ladder length field to a different value. In the embodiment described herein, substantially all intermediate (e.g. $K_{n-1}$, $K_4$ 215, $K_3$ 182, etc.) values in the key ladder will come out wrong, and the attacker will not succeed because the initial value the attacker provides for decryption will most likely not have the correct key ladder length.

In one embodiment, a first decryptor 105 in the key ladder 100 receives two inputs: a key 130 which is at the highest level of the key ladder 100; and an initial input 140. The key 130 at the highest level of the key ladder 100 is depicted in FIG. 1 as a key 130 that is stored in one time programmable (OTP) memory 133. It is appreciated that the representation of key 130 as a key stored in OTP 133 is by way of example, and any other appropriate way of securely storing key 130, such as EEPROM, PUF (Physically Uncloneable Function) and so forth, may be implemented in key ladder 100.

The second input to the first decryptor 105 mentioned above, the initial input 140, comprises an encrypted key $EK_n$ 150, which is decrypted by the decryptor 105 using the key 130 as a decryption key. The output of the decryption of encrypted key $EK_n$ 150 by the decryptor 105 is decryption key $K_n$ 155, which is then available for input into a second decryptor 110 for use as the decryption key $K_n$ 155, when encrypted decryption key $EK_{n-1}$ 160 is input into the second decryptor 110. This process is repeated iteratively for each decryption step, indicated in FIG. 1 by the various encrypted inputs, such as $EK_3$ 184, $EK_2$ 188, and $EK_1$ 192, and output keys which, respectively, are input into subsequent decryptors 115, 120, 125, such as keys $K_3$ 182 and $K_2$ 190. In the final iteration of key ladder 100, key $K_1$ 165 is output. The decryption of $K_1$ 165 enables the decryption of ciphertext 173 by decryptor 170, to produce plaintext 178. It is appreciated that any other use of $K_1$ 165, as is known in the art, may also occur at this stage.

Those skilled in the art will appreciate that the encrypted decryption keys, such as $EK_{n-1}$ 160, $EK_3$ 184, $EK_2$ 188, and $EK_1$ 192, and so forth, are received as externally provided outputs, typically by the user of the key ladder 100. For example, in a video security system, the user/operator can send the encrypted decryption keys in an entitlement control message (ECM) or an entitlement management message (EMM).

The initial input 140 to the first decryptor 105 also comprises a key ladder length 180. In one embodiment, the maximum length of the key ladder 100 (i.e. the maximum number of iterations of the decryption step, as is described above) will be $2^i-1$, where i is the number of bits in the key ladder length 180. By way of example, if the initial input 140 is 128 bit long, and the key ladder length 180 is the eight least significant bits in the 128 bits of the initial input 140, then: input $EK_n$ 150 will be 128 bits, and the key ladder will have at most 255 iterations (i.e. $2^8-1$). The key ladder length 180 is a part of $EK_n$ which is typically stored by a processor in a first register.

It should be appreciated that the key ladder length 180 will be embedded into $EK_n$ under the control of whatever authority is managing or administering this system. By way of example, if the key ladder 100 system is for use in a pay television decoder, then the broadcaster or cable-TV operator would determine the value of the key ladder length 180.

In practice, however, typical applications which utilize key ladders may need fewer than the $2^i$ possible iterations. Accordingly, in one embodiment, only n iterations of the key ladder 100 are executed, where n is the value of the key ladder length. Continuing with the example above where the initial input 140 is 128 bits long, and the key ladder length 180 is the first eight bits in the 128 bits of the initial input 140, if the first eight bits are: 00000011 (i.e. the value of the key ladder length 180 is 3), then the decryptor 105 would perform only three iterations of decryptions, as will be described below, with reference to FIG. 2.

The key ladder length 180 may be placed in any location in the initial input 140, so long as the location of the length 180 in the initial input 140 is known to a processor, so that the key ladder length 180 is determined prior to inputting the initial input 140 as $EK_n$ 150 into the first decryptor 105. The decryption logic, that is to say the key ladder 100 itself, may be programmed (in hardware, software, or a combination of software and hardware) to locate the key ladder length 180 field in $EK_n$ 150 and to apply this value to the key ladder length 180. Key ladder length 180 may be: at the start of the initial input 140; at the end of the initial input 140; or in some other known location in the initial input 140. In principle, the bits comprising the key ladder length 180 may be distributed throughout the initial input 140 in known locations (e.g. if initial input 140 is 256 bits long, and the key ladder length 180 is eight bits long, the key ladder length 180 may be formed by taking eight known bits from among the 256 bits of the initial input 140, and concatenating those eight bits to form the key ladder length 180).

It should be appreciated, in this example, that although the size of key $EK_n$ remains unchanged, because the i bits of the key ladder length 180 are fixed (having value n), the entropy or size of the key space from which the key is chosen is reduced. Because key ladder 100 is operated as a loop having n steps (i.e. the value of n becomes a loop index for the key ladder) in the key ladder 100, the key ladder 100 is of variable (i.e. extendable) length.

It should also appreciated that in some embodiments, the key ladder length 180 may not be included in the encrypted key $EK_n$ 150, but rather the key ladder length 180 may be embedded in key $K_n$ 155. That is to say, that $EK_n$ 150 is originally encrypted so that when it is decrypted using OTP Key 130, the resulting key $K_n$ 155 includes in it the key ladder length 180.

Figure 2:
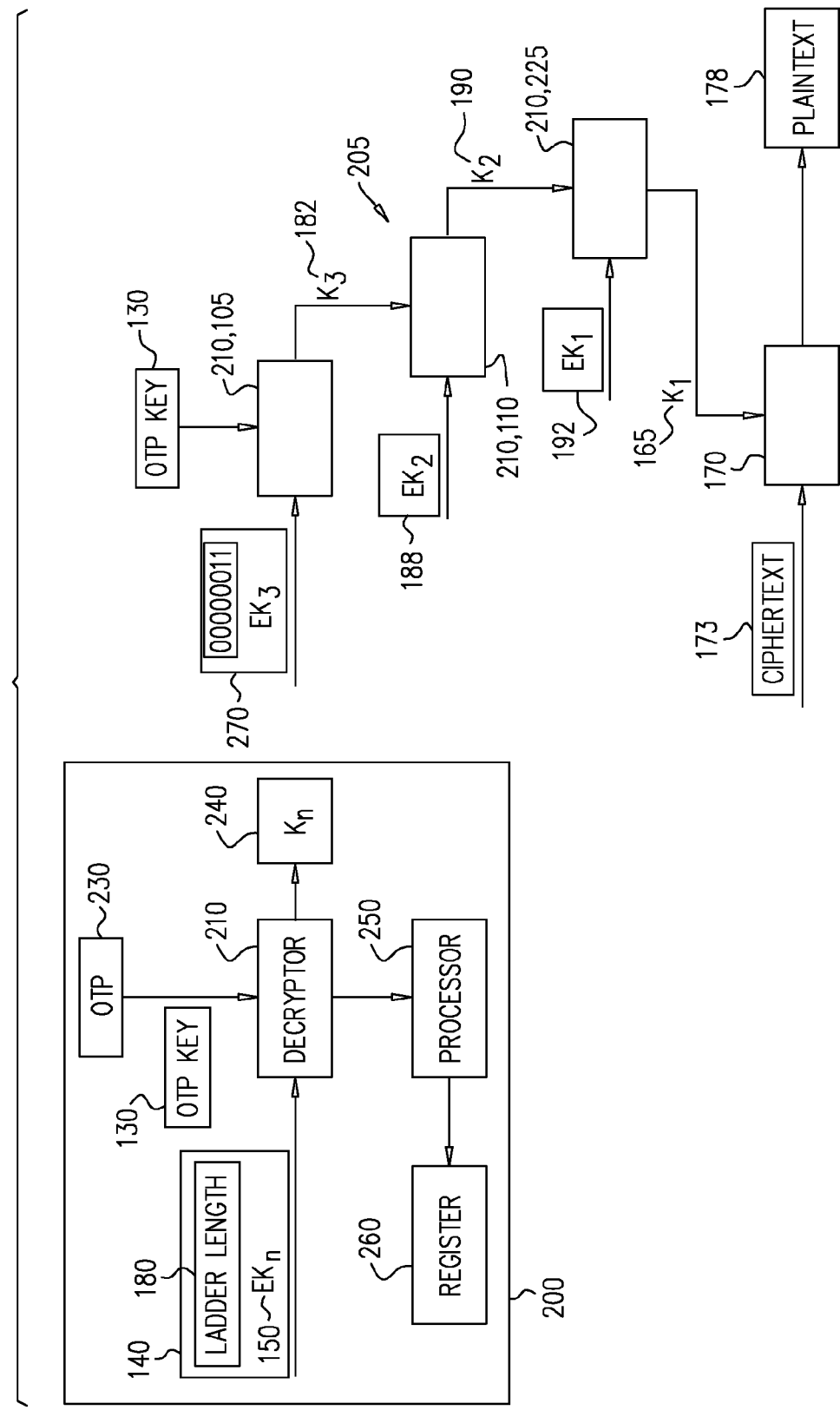
FIG. 2 is a simplified illustration of an apparatus implementing the embodiment depicted in FIG. 1, executing a three step key ladder.

Reference is now made to FIG. 2, which is a simplified illustration of an apparatus 200 implementing the embodiment depicted in FIG. 1, executing a three step key ladder 205. The left side of FIG. 2 shows a simplified block diagram depiction of an exemplary apparatus 200 in which the three step key ladder 205 is executed. The initial input 140, comprising the encrypted key $EK_n$ 150 and the key ladder length 180, is input into a decryptor 210. The decryptor 210 retrieves the OTP key 130 from OTP memory 230. Using the OTP key 130, the decryptor 210 decrypts the encrypted key $EK_n$ 150, and outputs decrypted key $K_n$ 240. Once $EK_n$ 150 is input into the decryptor 210, the key ladder length 180 is input to the processor 250, which stores it in a register 260.

Turning to the right portion of FIG. 2, the above description corresponds to inputting initial input 270 into decryptor 210, 105 (both reference numbers are used, in order to show the correspondence between FIGS. 1 and 2). Initial input 270 comprises key ladder length 180, depicted as 00000011 (i.e. 3), embedded in encrypted $K_3$, i.e. $EK_3$. Decryptor 210, 105 decrypts $EK_3$ and outputs $K_3$. The following two rounds depicted on the left side of FIG. 2 proceed as was noted above, with reference to the final two steps of the key ladder depicted in FIG. 1, resulting, in the final step, in the output of plaintext 178 by decryptor 170.

With the execution of each subsequent round of the key ladder 205 by the apparatus 200, the processor 250 decrements the value stored in register 260. When the value stored in register 260 reaches zero, the loop being executed is stopped, and $EK_1$ 192 has been decrypted, producing key $K_1$ 165. The decryption of $K_1$ 165 enables the decryption of ciphertext 173 by decryptor 170, to produce plaintext 178, as noted above. It should be appreciated that any other use of $K_1$ 165, as is known in the art, may also occur at this stage.

Figure 3:
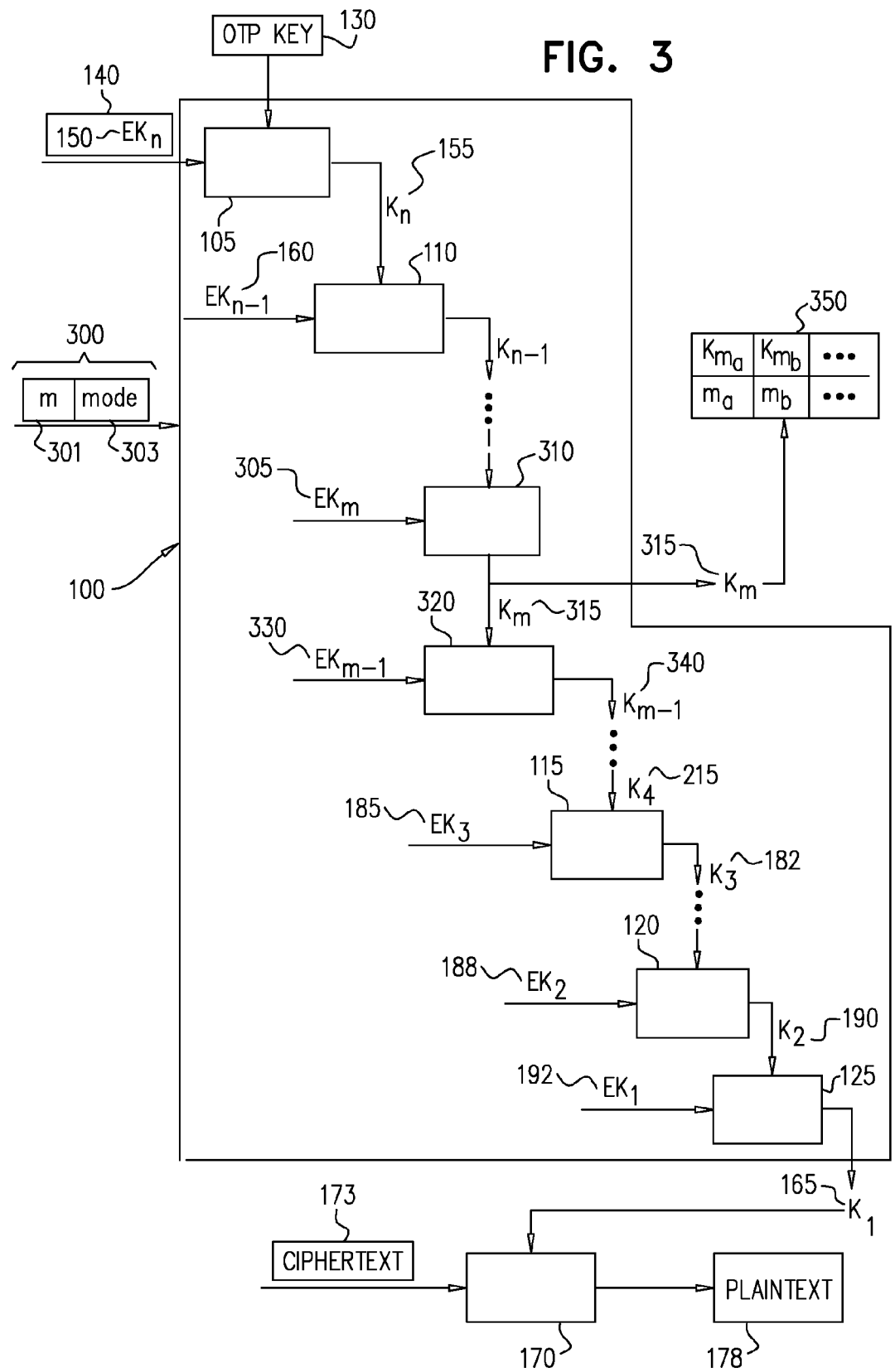
FIG. 3 is a simplified illustration of a key ladder constructed and operative in accordance with a second embodiment.

Reference is now made to FIG. 3, which is a simplified illustration of the key ladder 100 constructed and operative in accordance with a second embodiment. In the embodiment of FIG. 3, the key ladder 100 is of a fixed length determined during design time. In FIG. 3, the key ladder 100 is depicted as having n steps. The initial input 140 comprises the encrypted key $EK_n$ 150. The first decryptor 105 also receives the OTP key 130 for decrypting the encrypted key $EK_n$ 150. The key ladder 100 also receives an additional input 300. The additional input 300 comprises an input parameter m 301, which is a number of iterations above the final iteration of the key ladder 100 (i.e. decryptor 125) where an intermediate result, $K_m$ 315 is side-stored in a second register 350. The additional input 300 also comprises at least one bit input 303 which is indicative of the mode of operation of the key ladder 100. The input parameter m 301 and the at least one bit input 303 are received by the key ladder 100 from a user/operator of the key ladder 100. For example, in a video security system, the user/operator can send the input parameter m 301 and the at least one bit input 303 in an entitlement control message (ECM) or an entitlement management message (EMM).

In a first mode, indicated by the at least one bit input 303, key ladder 100 operates in its entirety, from the steps of inputting the encrypted key $EK_n$ 150 and the OTP key 130 into the first decryptor 105, through to the output of the final iteration of key ladder 100 when key $K_1$ 165 is output. During operation of the key ladder 100 in the first mode, intermediate decryptor 310 receives the output key $k_{m+1}$ (from a previous decryption operation, not depicted) and encrypted key $EK_m$ 305. The intermediate decryptor 310 outputs a decrypted key $K_m$ 315, which is input into decryptor 320 for use in decrypting $EK_{m-1}$ 330, and producing key $K_{m-1}$ 340. However, key $K_m$ 315 is also side-stored in the second register 350. Additionally, the value of m 301 is also side-stored along with the value $K_m$ 315. This enables having different values of m which can be used for various operations. For instance, in one set of operations, m may be equal to 3, and in a second state of operations, m may be 4.

Accordingly the second register 350 stores the values of $K_{ma}$ and in tandem, $m_a$; $K_{mb}$ and in tandem, $m_b$; and so forth, as is depicted in FIG. 3.

In a second mode, indicated by the at least one bit input 303, key ladder 100 need not be executed in its entirety, but rather, key $K_m$ 315 may be retrieved from the second register 350, and key ladder 100 may be executed beginning from the $EK_{m-1}$ to $K_{m-1}$ decryption operation (i.e., decryptor 320). A savings of time, e.g., on the order of the several milliseconds of time needed to execute all of the previous decryption steps of key ladder 100, thereby results for all executions of the key ladder 100 in this second mode.

It is appreciated that $K_m$ 315 may be any of the intermediate keys. When the key ladder 100 is resumed from step m, it proceeds for m steps, and the key ladder logic enforces the correct number of iterations, since it was side-stored alongside $K_m$ in register 350.

The key ladder 100 is executed in the first mode (i.e. the key ladder 100 operates in its entirety), when the key ladder 100 is reset or when the key ladder 100 effective height needs to be extended. The key ladder 100 is executed in the second mode (i.e. beginning at decryptor 320) in other cases, specifically, when the intermediate result $K_m$ already exists, and therefore, only the final m levels of the key ladder 100 need to be executed.

In the present embodiment, the key ladder 100 is protected against shortening of the Key ladder length when the key ladder 100 is executed in the second mode (i.e. beginning at decryptor 320) since the key ladder 100 has also side-stored m, and then the key ladder 100 proceeds to perform m levels, based on the side-stored value of m. So effectively, the key ladder 100 always performs exactly n levels, even though it might perform just the bottom m levels now. As such, no matter how a potential hacker may attempt to manipulate the input parameter m 301 and the at least one bit input 303, the hacker is prevented from performing an attack by manipulating the key ladder length.

In still another embodiment, the methods described above with reference to FIG. 1 and FIG. 3 may be combined, so that a extendable length key ladder 100 may also side-store an intermediate result, so that the extendable length key ladder 100 may be executed beginning from an intermediate stage.

Figure 4:
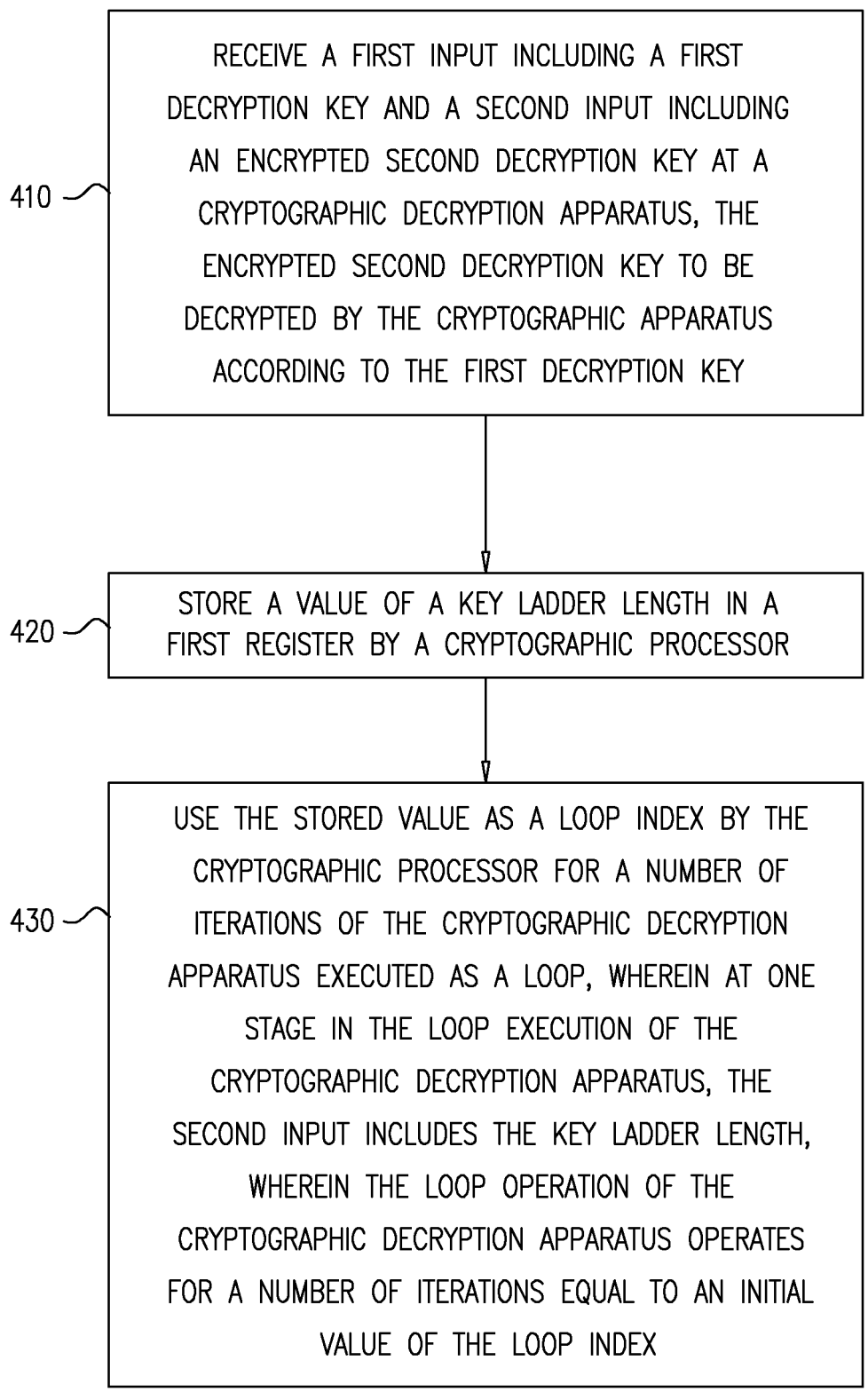
FIG. 4 is a flowchart diagram of a method of implementing the system of FIG. 1.

Reference is now made to FIG. 4, which is a flowchart diagram of a method of implementing the system of FIG. 1. In step 410, a first input is received at a cryptographic decryption apparatus, the first input including a decryption key. A second input is also received at a cryptographic decryption apparatus, the second input including an encrypted second decryption key, the encrypted second decryption key to be decrypted by the cryptographic decryption apparatus according to the first decryption key.

In step 420, a value of a key ladder length is stored by a cryptographic processor in a first register.

In step 430 the stored value is used as a loop index by the cryptographic processor for a number of iterations of the cryptographic decryption apparatus to be executed as a loop, wherein, at one stage in the loop execution of the cryptographic decryption apparatus, the second input includes the key ladder length, wherein the loop operation of the cryptographic decryption apparatus operates for a number of iterations equal to an initial value of the loop index.

It should be appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It should be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   receiving a first input comprising a first decryption key and a second input comprising an encrypted second decryption key at a cryptographic decryption apparatus, wherein the encrypted second decryption key is to be decrypted by the cryptographic decryption apparatus according to the first decryption key,
   wherein the second input comprises the key ladder length as a part of the encrypted second decryption key decrypted by the cryptographic decryption apparatus;
   storing a value of the key ladder length in a first register by a cryptographic processor; and
   using the stored value as a loop index by the cryptographic processor for a number of iterations of the cryptographic decryption apparatus executed as a loop, wherein at one stage in execution of the loop of the cryptographic decryption apparatus, the second input comprises the key ladder length,
   wherein the execution of the loop of the cryptographic decryption apparatus operates for the number of iterations equal to an initial value of the loop index,
   wherein an output from a previous iteration of the loop comprises the first input to the cryptographic decryption apparatus for a following iteration of the loop.

2. The method according to claim 1 wherein the second input comprises the key ladder length as a part of the encrypted second decryption key.

3. The method according to claim 1 wherein an output of an iteration of the loop is stored in a second register, and is also used as the first input to the cryptographic decryption apparatus for a following iteration of the loop.

4. The method according to claim 1 wherein an output of a final iteration of the loop comprises a key for decryption of a ciphertext.

5. The method according to claim 4 wherein the key for decryption of the ciphertext is arranged to be provided as an input into a second cryptographic decryption apparatus for decryption of the ciphertext.

6. The method according to claim 4 wherein the ciphertext comprises an output of an encryption operation which has been executed on a binary file.

7. The method according to claim 6 wherein the binary file is a binary file associated with a content item.

8. The method according to claim 7 wherein the content item comprises at least one of a video content item or an audio content item.

9. The method according to claim 1 wherein the cryptographic decryption apparatus comprises a single hardware-based cryptographic decryption apparatus.

10. The method according to claim 1 wherein the cryptographic decryption apparatus comprises a plurality cryptographic decryption apparatuses.

11. The method according to claim 1 wherein the first input is stored in one time programmable memory.

12. The method according to claim 1 wherein the first register comprises volatile memory.

13. The method according to claim 1 wherein the second input is received from one of a user or an operator of the cryptographic decryption apparatus.

14. The method according to claim 1 wherein the second input is received in an entitlement control message (ECM).

15. The method according to claim 1 wherein the second input is received in an entitlement management message (EMM).

16. An apparatus comprising:
   a first register;
   a cryptographic decryption apparatus operative to receive a first input to the cryptographic decryption apparatus comprising a first decryption key and a second input to the cryptographic decryption apparatus comprising an encrypted second decryption key, the encrypted second decryption key configured to be decrypted by the cryptographic decryption apparatus according to the first decryption key,
   wherein the second input comprises the key ladder length as a part of the encrypted second decryption key decrypted by the cryptographic decryption apparatus; and
   a cryptographic processor which stores a value of a key ladder length in the first register and uses the stored value as a loop index for a number of iterations of the cryptographic decryption apparatus executed as a loop, wherein at one stage in the loop execution of the cryptographic decryption apparatus, the second input comprises the key ladder length, wherein the loop operation of the cryptographic decryption apparatus operates for a number of iterations equal to an initial value of the loop index,
   wherein an output from a previous iteration of the loop comprises the first input to the cryptographic decryption apparatus for a following iteration of the loop.

17. An apparatus comprising:
   a cryptographic key ladder comprising a cryptographic decryption apparatus;
   a first input to the cryptographic apparatus comprising a first decryption key;
   a second input to the cryptographic apparatus comprising an encrypted second decryption key, the encrypted second decryption key configured to be decrypted by the cryptographic apparatus according to the first decryption key,
   wherein the second input comprises the key ladder length as a part of the encrypted second decryption key decrypted by the cryptographic decryption apparatus;

a third input comprising a mode variable and a value, m; and a cryptographic processor which stores the value of m and the mode variable in a first register, wherein the cryptographic key ladder is configured to be operated in two modes, according to the mode variable:

a first mode, where the cryptographic key ladder is operated in its entirety, and an output of an $m^{th}$ iteration of the cryptographic decryption apparatus and the value of m are side-stored in a second register; and a second mode, where the stored output of the $m^{th}$ iteration of the cryptographic decryption apparatus and the value of m are retrieved from the second register and the cryptographic key ladder is operated beginning from an $(m-1)^{th}$ iteration, wherein an output from a previous iteration of the loop comprises the first input to the cryptographic decryption apparatus for a following iteration of the loop.

* * * * *